M. E. KILKENNY.
POTATO HARVESTER.
APPLICATION FILED APR. 27, 1918.
1,333,493.
Patented Mar. 9, 1920.
3 SHEETS—SHEET 2.
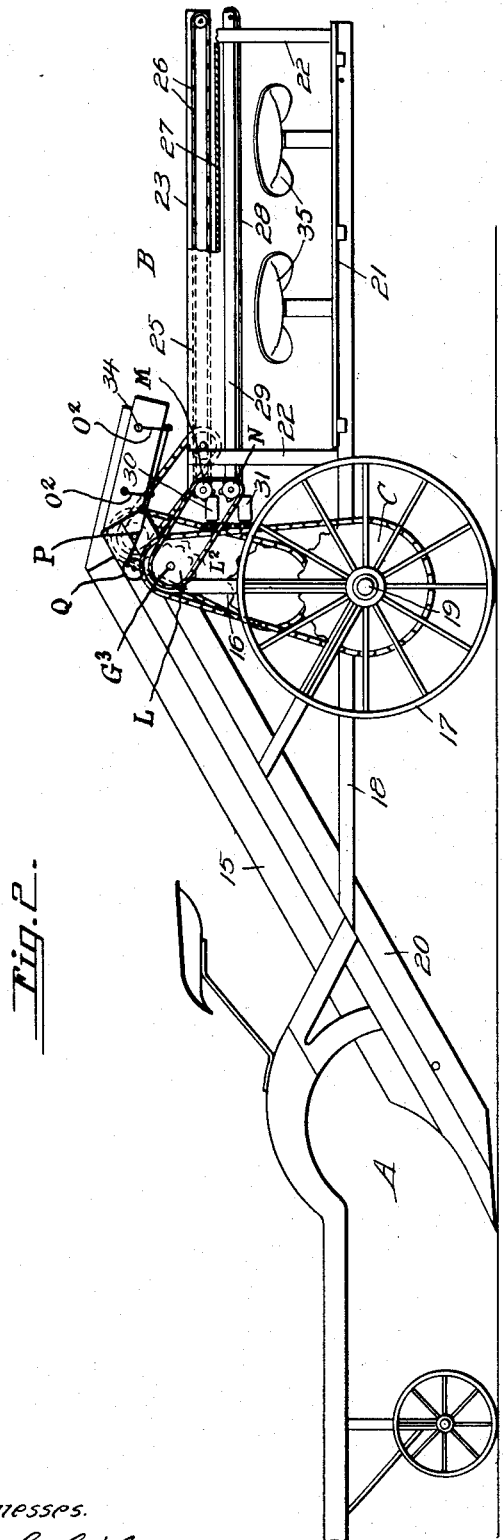
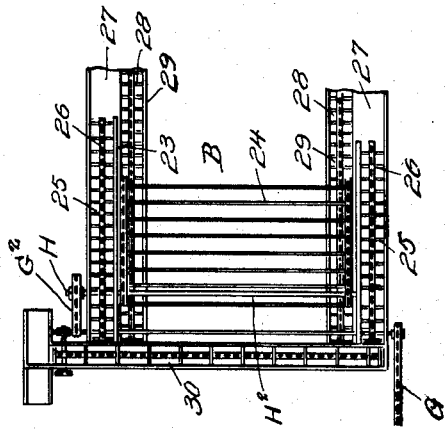
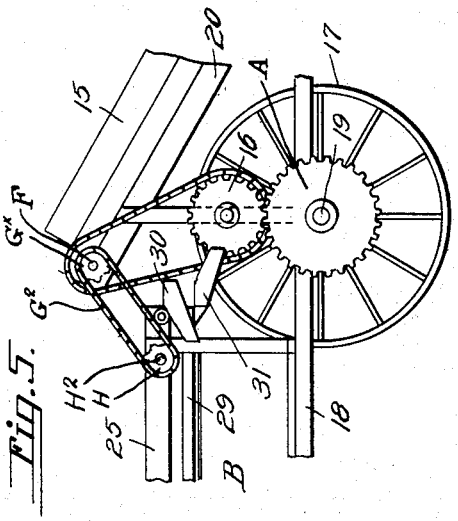
Witnesses.
Inventor
Michael E. Kilkenny.
By Victor J. Evans
Attorney

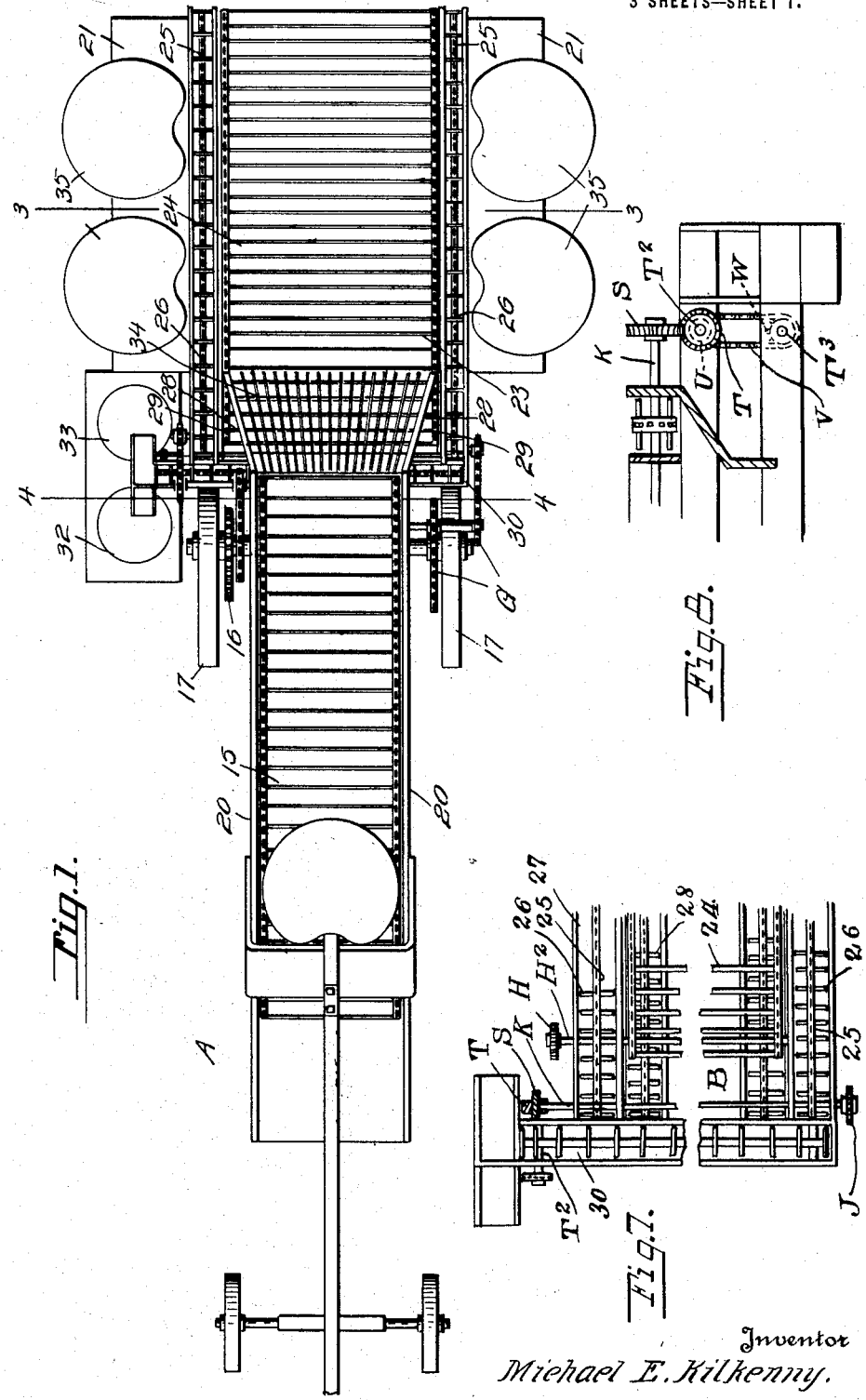

M. E. KILKENNY.
POTATO HARVESTER.
APPLICATION FILED APR. 27, 1918.

1,333,493.

Patented Mar. 9, 1920.
3 SHEETS—SHEET 3.

Witnesses.
F. C. Gibson.
Wm. Bagger.

Inventor
Michael E. Kilkenny.

By Victor J. Evans
Attorney

UNITED STATES PATENT OFFICE.

MICHAEL E. KILKENNY, OF PORTLAND, OREGON.

POTATO-HARVESTER.

1,333,493.   Specification of Letters Patent.   Patented Mar. 9, 1920.

Application filed April 27, 1918. Serial No. 231,190.

*To all whom it may concern:*

Be it known that I, MICHAEL E. KILKENNY, a citizen of the United States, residing at Portland, in the county of Multnomah and State of Oregon, have invented new and useful Improvements in Potato-Harvesters, of which the following is a specification.

This invention relates to potato harvesters and it has specific reference to an attachment for potato diggers for the purpose of separating the potatoes from dirt, weeds and vines, and also for sorting the potatoes according to size.

The invention has for its object to produce a simple and improved device which may be readily attached and operated in connection with a potato digger of well known construction, said attachment including a moving table or platform, and separate conveyers to receive the potatoes which are taken by hand from the moving table and for conveying the same to sacks or receptacles.

A further object of the invention is to simplify and improve the construction and operation of the improved attachment.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of the improved attachment showing also a portion of a potato digger to which the same is applied.

Fig. 2 is a side elevation partly in section of the same.

Figs. 5 and 6 are detail views of parts of the invention.

Fig. 7 is a detail top plan view showing the driving connections for the conveyers 30 and 31.

Fig. 8 is a detail end view of the conveyers 30 and 31 and their driving connections.

Corresponding parts in the several figures are denoted by like characters of reference.

The digger, a portion of which is shown at A includes an elevating conveyer 15 which is driven by gearing from one of the ground wheels 17.

Figure 4:
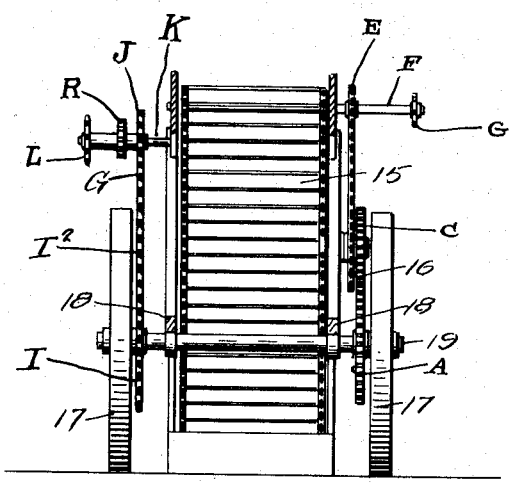
Fig. 4 is a transverse sectional view taken on the line 4—4 in Fig. 1.

The improved attachment which is generally indicated by B includes sills 18 which are supported on the main axle 19 of the digger, the forward ends of said sills being made fast to the frame 20 of the conveyer 15. The sills 18 extend rearwardly of the digger and support a frame structure including running boards 21, uprights 22 and a table 23 over which is trained an endless conveyer apron 24. Adjacent to each side of the table 23 is a longitudinal trough 25 which constitutes a casing for an endless chain conveyer 26 which also constitutes a separator. Between the upper and lower stretches of the conveyer 26 at each side of a table or platform is arranged a deflector 27 over which potatoes passing through the links of the conveyer 26 will be deflected to a conveyer 28 arranged in a trough or casing 29. Transmission means which may consist of gearing, link belts and sprockets, or any other well known means of transmitting motion, and which is generally designated by the character G is provided for transmitting motion from moving parts of the potato digger to the conveyers 24, 26 and 28, the gearing being so arranged that the upper stretch of the conveyer 24 will move in a rearward direction, while the upper stretches of the conveyers 26 and 28 will move in a forward direction. The gearing illustrated will be readily understood when it is stated that it includes a spur gear A fixed to one of the ground wheels 17, a spur gear 16 intermeshed with said gear A, a sprocket gear C, Fig. 4, fixed to said gear 16, and a sprocket belt D trained over the gear C and a sprocket gear E fast on the upper shaft F of the elevating conveyer 15. A sprocket gear G× on the shaft F is connected by a sprocket belt G², Fig. 5, with a sprocket gear H on the shaft H² of the conveyer 24, with the result that said conveyer is driven rearwardly. A sprocket gear I fixed to the other ground wheel 17, Fig. 4, is connected by a sprocket belt 12 with a sprocket gear J on the shaft K to rotate the latter and drive the conveyers 26. Over the conveyers 26 and 28 material is discharged adjacent to the forward end of the platform 23 onto suitably driven transversely disposed conveyers 30—31, whereby the material is carried to and deposited in receptacles or bags 32—33 that are supported in any convenient manner.

Figure 3:
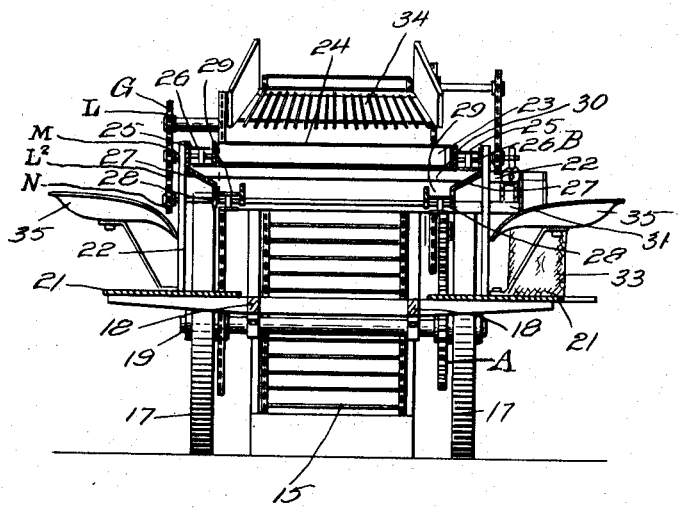
Fig. 3 is a transverse sectional view taken on the line 3—3 in Fig. 4.

A spiral gear S on shaft K, Fig. 7, is intermeshed with a gear T on a shaft $T^2$ that carries a sprocket gear U, which gear U is connected by a sprocket belt V with a sprocket gear W on a shaft $T^3$, Fig. 8. The shafts $T^2$ and $T^3$ are the shafts of the conveyers 30 and 31 to drive the latter in the proper direction. At L on a shaft $G^3$, Figs. 2, 3, and 4, is a sprocket gear that is connected with a sprocket gear m and a sprocket gear n by a sprocket belt $L^2$ to drive the conveyers 26 and 28.

The conveyer apron 24 is of a width materially exceeding that of the elevating conveyer 15 which forms a part of the digger. A downwardly and rearwardly inclined shaking fork 34 receives material discharged over the conveyer 15 and distributes said material over the entire width of the apron 24. The material being thus discharged enables the said apron to be driven at relatively low speed to enable operators who occupy the seats 35 on the running board to separate the potatoes from the vines and weeds, placing the potatoes on the conveyers 26. Small potatoes will pass through the links of said conveyers and will be deflected to the conveyers 28, the large and small potatoes being carried in a forward direction and discharged on the transversely disposed conveyers 30 and 31, while the refuse will be discharged in a rearward direction over the tail end of the conveyer 24.

The shaking fork 34 is suspended on both sides by hangers $O^2$ which are oscillated by a pitman P which is attached to sprocket gear Q, Fig. 2, which sprocket gear Q is connected by a sprocket belt with the sprocket R on the shaft $G^3$, Fig. 4.

By the simple mechanism herein described potatoes may be picked, separated and sorted much more expeditiously and in a much easier manner than by picking the potatoes from the ground. It is obvious that seats may be provided for any numbers of operators that may be required to handle the crop. It is also to be understood that while the invention has been herein described as a potato harvester, the principles of the invention may be applied to machines for harvesting or gathering other crops.

What is claimed is:—

1. The combination with a potato digger having an elevating conveyer of a device supported on the frame of the potato digger, said device including a horizontal platform, a conveyer apron trained over said platform, said apron being of a width materially exceeding that of the elevating conveyer, means for driving the conveyer apron to move the upper stretch of said apron in a rearward direction, and a shaking fork for distributing potatoes throughout the width of the conveyer apron and over which material will be discharged from the elevating conveyer to the conveyer apron.

2. The combination with a potato digger having an elevating conveyer, a picking and separating attachment supported on the frame of the digger and including a conveyer apron, a horizontal platform over which said apron is trained, and means for driving the upper stretch of said apron in a rearward direction, said apron being of a width materially exceeding that of the elevating conveyer, and movable distributing means over which material will be discharged from the elevating conveyer and spread over the width of the conveyer apron.

3. The combination with a potato digger having an elevating conveyer, a picking and separating attachment supported on the frame of the digger and including a conveyer apron, a platform over which said apron is trained, and means for driving the upper stretch of said apron in a rearward direction, said apron being of a width materially exceeding that of the elevating conveyer, and means over which material will be discharged from the elevating conveyer and distributed over the width of the conveyer apron; and running boards having seats arranged in proximity to the sides of the conveyer apron.

4. The combination with a potato digger including a wheeled supported frame and an elevating conveyer, a picker and separating attachment including a driven conveyer apron of a width materially exceeding that of the elevating conveyer, a shaking fork over which material is transferred from the elevating conveyer to the conveyer apron, and auxiliary conveyers adjacent to the sides of the conveyer apron; and means whereby the top stretches of said auxiliary conveyers will be driven in a forward direction, reversely to the movement of the top stretch of the conveyer apron.

5. In a picker attachment for potato diggers, a platform, a conveyer apron trained over said platform, means whereby the top stretch of said apron will be driven in a forward direction, conveyer troughs adjacent to the sides of the apron, separating conveyers in said troughs, said conveyers being composed of links that are open for the passage of articles below a predetermined size, means for driving the top stretches of said separating conveyers in a forward direction, reversely to the movement of the top stretch of the apron, means for disposing of the material discharged over the separating conveyers, and means for disposing of the material passing through the separating conveyers.

6. In a picker attachment for potato diggers, a platform, a conveyer apron trained over said platform, means whereby the top stretch of said apron will be driven in a forward direction, conveyers in said troughs, said conveyers being composed of links that are open for the passage of articles below a predetermined size, means for driving the top stretches of said separating conveyers in a forward direction, reversely to the movement of the top stretch of the apron, means for disposing of the material discharged over the separating conveyers, and means for disposing of the material passing through the separating conveyers, said last mentioned means consisting of auxiliary conveyers arranged to receive material discharged through the separating conveyers.

7. In a picker attachment for potato diggers, a platform, a conveyer apron trained over said platform, means whereby the top stretch of said apron will be driven in a forward direction, conveyers in said troughs, said conveyers being composed of links that are open for the passage of articles below a predetermined size, means for driving the top stretches of said separating conveyers in a forward direction, reversely to the movement of the top stretch of the apron, means for disposing of the material discharged over the separating conveyers, and means for disposing of the material passing through the separating conveyers, said last mentioned means consisting of auxiliary conveyers arranged to receive material discharged through the separating conveyers, and deflectors interposed between the top and bottom stretches of the separating conveyers to divert material to the auxiliary conveyers.

8. A picking and separating attachment for potato diggers comprising a platform, an apron trained over the same, means for driving the top stretch of the apron in a rearward direction, separating conveyers arranged adjacent to the sides of the apron, auxiliary conveyers arranged below the separating conveyers, means for diverting material passing through the separating conveyers to the auxiliary conveyers, means for driving the top stretches of the separating and auxiliary conveyers in a forward direction, reversely to the movement of the top stretch of the conveyer apron, and suitably driven transversely disposed conveyers to receive and dispose of the material discharged over the separating conveyers to the auxiliary conveyers.

In testimony whereof I affix my signature.

MICHAEL E. KILKENNY.